United States Patent
Holderied et al.

(10) Patent No.: US 7,635,511 B2
(45) Date of Patent: Dec. 22, 2009

(54) SYNCHRONIZER RING

(75) Inventors: Meinrad Holderied, Igensdorf (DE); Friedrich Gebhard, Lauf/Peg (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 0 days.

(21) Appl. No.: 12/182,503

(22) Filed: Jul. 30, 2008

(65) Prior Publication Data
US 2008/0277234 A1    Nov. 13, 2008

Related U.S. Application Data

(63) Continuation of application No. 10/566,391, filed as application No. PCT/EP2004/007368 on Jul. 6, 2004, now abandoned.

(30) Foreign Application Priority Data

Jul. 29, 2003    (DE) ................. 103 34 895

(51) Int. Cl.
    *F16D 69/02*    (2006.01)
(52) U.S. Cl. ................. 428/66.2; 192/107 M
(58) Field of Classification Search .......... 428/66.2, 428/66.6, 66.7; 192/107 M
    See application file for complete search history.

(56) References Cited

U.S. PATENT DOCUMENTS

| | | | |
|---|---|---|---|
| 4,267,912 A | 5/1981 | Bauer et al. | |
| 4,700,823 A | 10/1987 | Winckler | |
| 5,478,642 A | 12/1995 | McCord | |
| 5,842,551 A | 12/1998 | Nels | |
| 5,851,588 A | 12/1998 | Uthoff, Jr. | |
| 5,952,249 A | 9/1999 | Gibson et al. | |
| 6,065,579 A | 5/2000 | Nels | |
| 6,221,475 B1 | 4/2001 | Domergue et al. | |

FOREIGN PATENT DOCUMENTS

| | | |
|---|---|---|
| DE | 697 02 078 T2 | 9/2000 |
| DE | 696 19 647 T2 | 1/2002 |
| EP | 0 786 299 B1 | 1/1997 |
| EP | 1 382 879 A1 | 7/2002 |
| WO | 96/10701 | 4/1996 |
| WO | 2005/019673 A1 | 3/2005 |

OTHER PUBLICATIONS

Patent Abstracts of Japan, Publication No. 2000220659 A, dated Aug. 8, 2000.
Patent Abstracts of Japan, Publication No. 08152028 A, dated Jun. 11, 1996.
LuK Kolloquium Article, Vorwort, Apr. 11/12, 2002, Printed in Germany.

*Primary Examiner*—Alexander Thomas
(74) *Attorney, Agent, or Firm*—Scully, Scott, Murphy & Presser, P.C.

(57) ABSTRACT

A synchronizer ring (10) having a support body (5), a conical friction surface (9), and a friction layer (14) of a material including carbon fibers applied to the friction surface (9). The material is a compacted carbon fiber reinforced plastic. A synchronizer ring of this type has a longer service life than those of the prior art, on account of the improved dimensional stability of the friction layer, and is inexpensive. Also disclosed is a method for producing the above-described synchronizer ring.

10 Claims, 2 Drawing Sheets

SYNCHRONIZER RING

CROSS REFERENCE TO RELATED APPLICATION

This application is a continuation application of co-pending U.S. Ser. No. 10/566,391; filed Jan. 27, 2006.

BACKGROUND OF THE INVENTION

1. Field of the Invention

The invention relates to a synchronizer ring having a support body made from metal, comprising a conical friction surface, and having a friction layer of a material comprising carbon fibers applied to the friction surface. Moreover, the invention also pertains to a method of producing the synchronizer ring.

Synchronizer rings are used in a mechanical transmission, in particular in an automotive transmission, to match the relative velocities between gearwheel and transmission shaft which occur during a gear change to one another. The synchronization is in this case achieved by friction between the corresponding friction partners. In transmissions used for vehicles with powerful engines, the synchronizer rings are subject to increased wear, on account of the high frictional load. The same is also true of automatic transmissions, for example in a transmission of a commercial vehicle or in a transmission of a passenger automobile in which high gearshift forces are applied. It is customary for synchronizer rings to be made from metal, preferably from brass. Synchronizer rings of the type described in the introduction have been used for some time to increase the service life of highly stressed synchronizer rings and therefore also that of the transmission, with the additional friction layer protecting the support from wear.

2. Discussion of the Prior Art

U.S. Pat. No. 4,267,912 has disclosed a synchronizer ring with a friction layer which consists of a synthetic resin reinforced with cellulose fibers. However, under high stresses, this friction layer disadvantageously fails to withstand the thermal conditions which are then present. Also, the transmission oil cannot be sufficiently displaced, with the result that the friction partner floats, thereby reducing the friction.

To solve the problem, it is proposed in U.S. Pat. No. 4,878,282 that the friction layer be provided with grooves.

For this purpose, U.S. Pat. No. 5,615,758, U.S. Pat. No. 5,842,551 and U.S. Pat. No. 5,998,311 have described a structured carbon fiber fabric and its production. A fabric of this type is presented in U.S. Pat. No. 6,065,579 for use as a friction layer for a synchronizer ring. The weaving operation and the arrangement of the warp and fill yarns produce a pronounced three-dimensional structure with peaks and valleys. To be fixed, the fabric is impregnated with a resin and then conditioned. On account of the three-dimensional structure, the transmission oil can flow in and out for cooling purposes and can also easily be displaced in the event of the friction layer coming under pressure. The weaving operation, however, is highly complex and a friction layer of this type is expensive to produce.

U.S. Pat. No. 4,700,823 discloses the use of a friction layer made from a carbon fiber reinforced plastic for clutch or brake disks. The friction layer is produced by means of the relatively complex and therefore expensive chemical vapor deposition (CVD) process.

U.S. Pat. No. 5,851,588 discloses an open-mesh friction layer made from a carbon fiber reinforced plastic for large-area planar friction applications, such as clutch or brake; in this case, the friction layer has been produced by liquid pressure infiltration (LPI).

Another use of a carbon fiber reinforced friction layer produced by means of LPI for large-area, planar friction partners, as in the case of a clutch or a brake, is known from U.S. Pat. No. 5,952,249.

Disadvantageously, all the friction layers mentioned are compressed under the high compressive forces as occur in synchronizer rings on account of the conical friction surface, which is smaller than in the case of clutches or brakes. On account of the loss of axial reserve displacement, there is a risk of a shortened service life or of premature failure.

SUMMARY OF THE INVENTION

It is an object of the present invention to provide a wear-resistant synchronizer ring with a friction layer made from a material comprising carbon fibers, which has an improved service life compared to the prior art and is inexpensive.

A further object of the invention resides in the provision of a method for producing the synchronizer ring as described herein.

For a synchronizer ring of the type described in the introduction, according to the invention this object is achieved by virtue of the fact that the material is a compacted carbon fiber reinforced plastic.

In the present context, a synchronizer ring is also to be understood as encompassing an outer ring, an inner ring or an intermediate ring. Rings of this type are used in multi-cone synchronizer mechanisms. The angle of inclination of the conical friction surface is usually between 6° and 10°.

In the present context, a carbon fiber reinforced plastic is to be understood as meaning a material which comprises carbon fibers incorporated for reinforcement and a certain proportion of a plastic. In the context of the present document, a material in which the carbon fibers are incorporated in a material with a small proportion of a plastic and a majority proportion of another material is also to be understood as being a carbon fiber reinforced plastic.

On account of the incorporation of the carbon fibers, the material has the required friction properties and the desired wear resistance.

Surprisingly, it has been found that a carbon fiber reinforced plastic increases the service life of the synchronizer ring if it is compacted. This can take place during the production process or at the end of it. The material is in this way compressed such that it is protected against further compression during the gearshift or synchronization operations. Therefore, the reduction in the axial gap is not promoted by the material being pressed together. Contrary to the previously held convictions of the specialist world, however, a compacted or compressed material of this type is not subject to any deterioration in its friction properties as a result of the friction partner floating. Surprisingly, it has been found that despite the compacting of the material, when the friction layer is used on the conical friction surface of the synchronizer ring, the transmission oil can be sufficiently pressed away from the friction surface. A coefficient of friction is quickly built up. Evidently, the remaining structures of the fibers and the residual porosity in the surrounding material are sufficient to achieve this.

It is advantageous for the thickness of the friction layer to be from 0.2 to 0.6 mm with the material being compacted in such a manner that under a surface pressure of 10 N/mm the friction layer undergoes a change in thickness of less than 0.015 mm, preferably of less than 0.01 mm.

A material which has been compacted in this way has particularly good and durable friction properties at the indicated thickness of the friction layer.

The material is advantageously produced from a carbon fiber fabric and a resin. In this context, a resin is to be understood as meaning a curable plastic. The dimensional stability is further improved by the compacted fabric which has been fixed by the resin. A phenolic resin is particularly suitable, although other oil-resistant and thermally stable resins are also suitable. It has proven expedient to use a single fabric layer.

The starting point for production is the carbon fiber fabric. The carbon fiber fabric is impregnated with the resin and then heated for the purpose of curing. The compacting of the material may take place during or after the curing. This compacting may involve the application of pressures of greater than 5 bar to the material.

Then, the material is advantageously heat-treated in such a manner that part of the resin is converted into carbon, the carbon being in amorphous and/or graphite form. The temperatures for this are between 900 and 1200° C. This preferably takes place under inert gas atmosphere. A carbon content in the resin improves the friction properties. The reserve displacement loss is also reduced. The proportion of carbon can be increased if further resin is supplied by impregnation or injection after the heat treatment and the working steps of the heat treatment are repeated.

It has been found that the carbon is washed out over the duration of use of the friction layer. This reduces the wear resistance of the friction layer. This problem can advantageously be avoided by the converted carbon finally being fixed by resin.

The friction layer is advantageously adhesively bonded to the friction surface using a thermally stable and oil-resistant adhesive, for example a phenolic resin or an epoxy resin adhesive. The adhesive is bonded to the plastic or penetrates into the remaining pores and openings and thereby permanently joins the friction layer to the support body.

Suitable materials for the support body are in particular brass, steel, in particular steel produced by sintering, or a composite made up of steel and brass.

BRIEF DESCRIPTION OF THE DRAWINGS

An exemplary embodiment of the invention is described in more detail with reference to a drawing, in which.

DETAILED DESCRIPTION OF THE INVENTION

Figure 1:
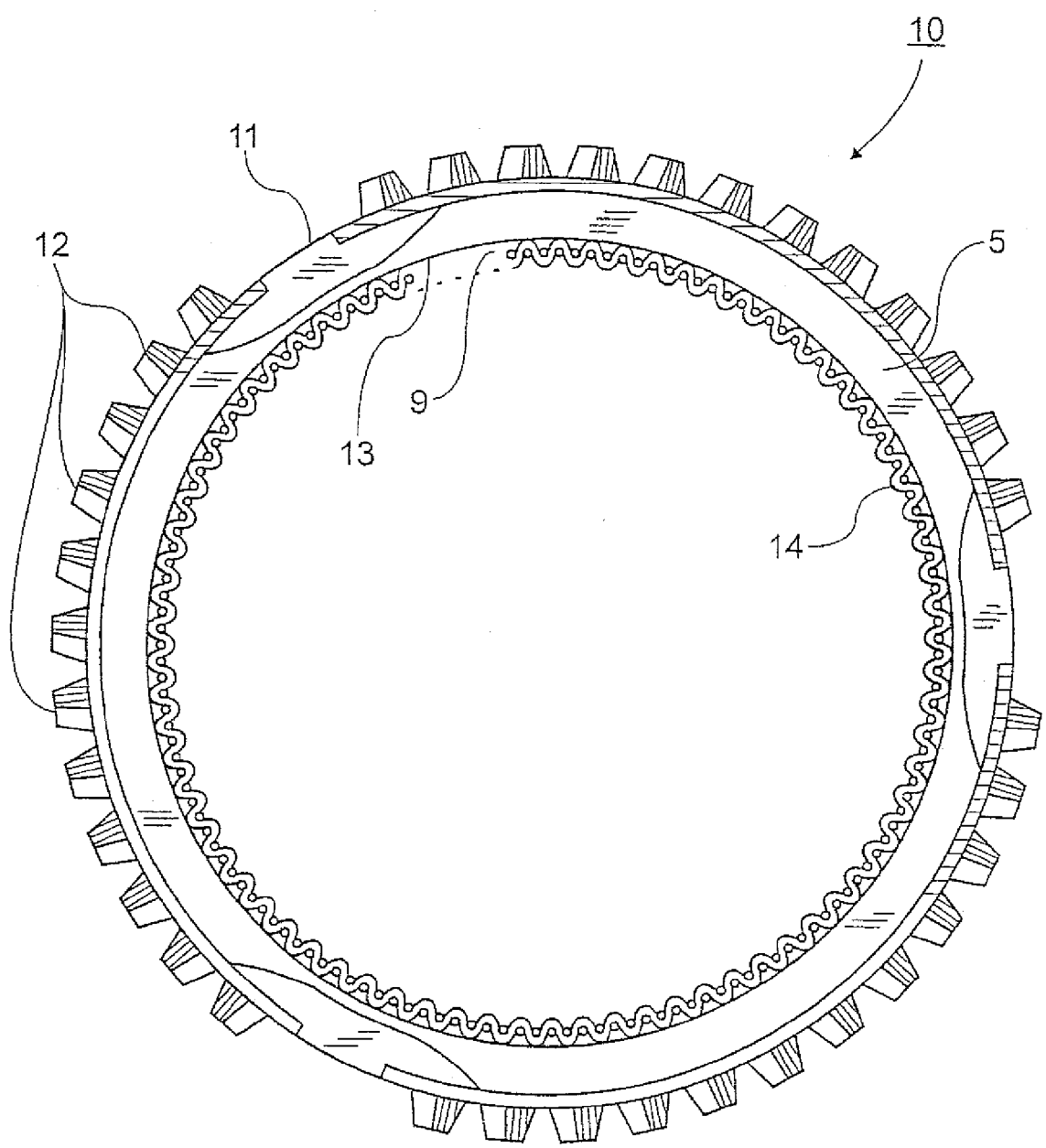
FIG. 1 shows a plan view of a synchronizer ring with a friction layer.

FIG. 1 shows a plan view of a synchronizer ring 10, the outer circumference 11 of which has teeth 12 as a formation which mechanically meshes with a gearwheel (not shown) of a transmission. On the inner circumference 13 of the synchronizer ring 10 is a conical friction surface 9, to which a friction layer 14 is attached. The friction layer 14 is positioned opposite a friction partner (not shown) which has a rotational speed relative to the synchronizer ring 10. During a gearshift actuation, the friction layer 14 comes into contact with the friction partner, with the result that the relative velocity between the function partners is reduced by friction and the friction partners are synchronized. The synchronizer ring 10 is made from brass.

In another embodiment (not shown), the friction layer 14 may be arranged on the outer circumference 11 of the synchronizer ring 10, and the teeth 12 on the inner circumference 13.

Figure 2:
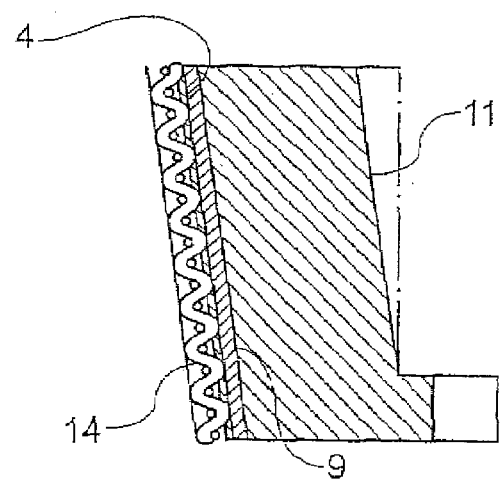
FIG. 2 shows a cross section through a synchronizer ring with attached friction layer.

FIG. 2 shows a cross section through the synchronizer ring 10 from FIG. 1 with friction layer 14. The synchronizer ring 10 illustrated has a conical friction surface 9. This is indicated by the inner circumference 13, which is illustrated on an inclination that is not to scale. The inclination of the friction surface is 8°.

The friction layer 14 of the synchronizer ring 10 comprises a compacted carbon fiber reinforced plastic and is 0.5 mm thick. The carbon fibers have been introduced in the form of a single-layer fabric. For production, the carbon fiber fabric was impregnated with a phenolic resin and cured. Then, the material was heat-treated at approx. 1100° C. under an inert gas atmosphere, in such a manner that the majority of the resin was converted into amorphous carbon.

Then, the material was impregnated with resin again and the heat treatment was repeated. Furthermore, thereafter the material was impregnated with resin once again, fixing the fabric and in particular the carbon produced in the resin.

As a final production step, the material was compacted. In this way, the friction layer 14, at its thickness for the synchronizer ring 10, under a surface pressure of 10 N/mm, undergoes a reduction in its thickness of less than 0.015 mm. The friction layer 14 is adhesively bonded to the friction surface 9 of the synchronizer ring using a phenolic resin adhesive.

The required geometry of the friction layer 14 was cut out from a larger unit (mat) of the material, taking account of the conical shape of the friction surface (14).

Figure 3:
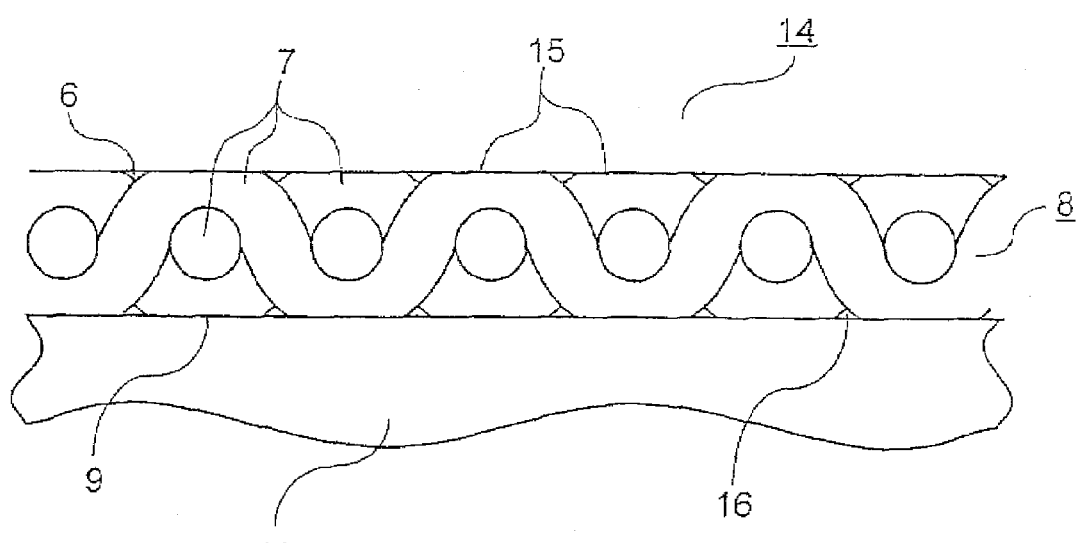
FIG. 3 shows an enlarged view of a friction layer attached to a synchronizer ring.

FIG. 3 diagrammatically depicts the friction layer 14 shown in FIGS. 1 and 2. The friction layer 14 in this case comprises a carbon fiber fabric 8 in a single layer. The fabric 8 has in this case been woven from fiber strands 7 which comprise a plurality of carbon fibers. The fabric peaks 15 have been flattened on account of the subsequent compacting. However, in some cases continuous residual pores 16 are still present. The fabric 8 itself has been embedded in a matrix 6 of resin and amorphous carbon.

For the material, it is possible to use a fabric which is, for example, in the form of a twill, linen or satin weave.

Compared to twill fabrics with relatively wide, continuous grooves, fabric with a linen weave does not have any diagonally continuous grooves, but rather a checkerboard-like arrangement of crossing points with warp threads at the top and crossing points with weft threads at the top. Fabrics with a satin bond, by contrast, are characterized by individualized crossing points, so that in this case too it is impossible for any continuous diagonal splines and ridges to form.

It is preferable to use a twill fabric which has a pronounced groove structure.

Weave lines which run diagonally with respect to the warp and weft threads over the fabric surface are characteristic of the twill weave. Fabrics produced in this way are characterized by a continuous, for example diagonal strip arrangement of lower-lying regions, which are referred to as grooves or channel-like recesses, and elevated regions, which are referred to as ridges. It is then advantageously possible for oil which is present in the grooves, which form oil channels, to flow unimpeded along the surface and consequently to dissipate frictional heat. The channel-like grooves or recesses may be oriented in any direction in particular when attaching the friction material to the substrate, for example a synchronizer ring, and consequently also in an extremely useful direction in which it is particularly easy for oil to flow in and out from and to adjacent regions. In particular, the channel-like grooves or recesses may be oriented according to a predetermined oil flow within a clutch casing or a transmission casing.

A particularly preferred variant uses a single-side fabric, i.e. the ridge and groove structure is more pronounced on one side of the fabric than on the other. The more strongly structured side of the fabric is in this case intended as the friction surface, while the smoother side is more suited to the adhesive bonding to the substrate, since it has a larger and more continuous adhesion surface than the surface with the groove and ridge structure. An example of fabrics of this type with a structured surface and a smooth surface is a twill-weave fabric.

The fiber strands 7 for producing the fabric consist either of polyacrylonitrile (PAN) filaments which have already been thermally stabilized, or a fabric made from PAN filaments is subjected to thermal stabilization prior to the carbonizing step. During the thermal stabilization, the PAN filaments are converted into an unmeltable form by air oxidation at preferably 200-400° C. with stretching. Yarns spun from stretch-broken oxidized polyacrylonitrile filaments have proven particularly suitable for production of the abovementioned fabric. The yarn linear density is between 120 and 170 tex. It is preferable to use twisted yarns, particularly preferably twists obtained by twisting two fibers which have been twisted in opposite directions, or fiber strands 7 which have been obtained by twisting together a plurality of twist fibers. One significant advantage of these twisted fiber strands 7 is that the individual filaments, under the action of pressure, may not lie flat next to one another in the plane, and therefore the fiber strands 7 always have a certain three-dimensional structure.

During the carbonization, the carbon content of the fiber strands 7 rises and the degree of distortion of the carbon matrix in the fiber strands 7 rises. Conditioning at 1000° C. leads to a carbon content of approx. 80% which rises still further at higher temperatures.

By way of example a mass-based carbon content of 95% is obtained if the heat treatment is carried out at 1800° C. The following statement approximately applies to the above range of carbonization temperatures: the higher the temperature during the heat treatment, the greater the carbon content of the fibers and the higher the thermal stability and modulus of elasticity of the material.

The resin performs a number of functions in the material. Firstly, it acts as a binder which binds the fibers of the fabric together and fixes them in position in the fabric. At low resin contents the fiber strands 7 are merely covered with a superficial film of resin, whereas at higher resin contents they are embedded in a thick resin matrix and are therefore also protected from mechanical stresses, for example caused by friction. Moreover, the addition of binder mechanically reinforces the fabric, i.e. it becomes more rigid and its compressibility is reduced.

The resin content contributes to retaining the advantageous structure of the original fabric even after impregnation with resin and after the pressing processes. On the one hand, the resin content must be sufficiently high to ensure the mechanical stability and rigidity of the material, to reduce the compressibility and to lower the oil permeability of the friction layer 14, but on the other hand the resin content must not be so great that the ridge and groove structure is completely leveled out by complete enclosure in a thick layer of resin.

It has emerged that after the pressing under the conditions described above, the friction materials still have a groove structure which is suitable for the flow of oil with a mass-based resin fraction in the range from 25 to 50%. The roughnesses $R_Z$ of these surfaces are approx. 30 to 50 μm, with the result that the friction material according to the invention is relatively unsusceptible to the formation of hydrodynamic films, which are undesirable for wet friction elements.

The roughness $R_Z$ of the friction layer 14 decreases as a result of the pressing operation and as the resin content increases. Moreover, an increase in resin content reduces the permeability of the material to air and the pore size distribution range, in particular at the expense of the small pores. The pore size distribution range is also reduced as a result of the pressing process, with in particular the small pores and spaces between the individual filaments belonging to the microtexture of the material being closed up as the resin content increases, whereas the macrotexture is affected to a lesser extent.

Another way of varying the extent to which the pores are filled with the material consists in adding particles of graphite or carbon black, which do not shrink during the carbonization, to the resin.

In another advantageous embodiment, during pressing a structure may have been embossed into the frictional layer 14 and/or the surface may have been structured.

According to another advantageous embodiment, the resin fraction of the material is partially or completely carbonized, for example is converted into carbon by solid-phase pyrolysis in an inert atmosphere at 800-1500° C. The result is a composite material whose matrix consists of carbon and is reinforced with a carbon fiber fabric (carbon fiber reinforced carbon, "CFC"). During the carbonization, the resin layer shrinks on account of the loss of mass caused by the release of volatile constituents.

What is claimed is:

1. A synchronizer ring comprising a support body consisting of a metal and having a conical friction surface that includes a friction layer applied thereto, said friction layer comprises a compacted carbon reinforced plastic including a plurality of fabric strands within a carbon fiber fabric having flatten peaks that are obtained prior to adhering to said conical friction surface, wherein the friction layer has a thickness from about 0.2 mm to 0.6 mm, and is compacted to an extent that under a surface pressure of 10 N/mm$^2$, said friction layer has a change in thickness of less than 0.015 mm.

2. The synchronizer ring of claim 1 wherein said compacted carbon fiber reinforced plastic comprises a twill fabric with a pronounced groove structure as one side of the fabric, and a relatively smooth opposite surface to facilitate adherence to said conical friction surface.

3. The synchronizer ring of claim 1 wherein said compacted carbon fiber reinforced plastic is produced from said carbon fiber fabric and a phenolic resin.

4. The synchronizer ring of claim 3 wherein said compacted carbon fiber reinforced plastic is heat treated to convert at least a fraction of said phenolic resin into carbon to produce a composite material having a matrix of carbon reinforced with a carbon fiber fabric (CFC).

5. The synchronizer ring of claim 4 wherein said carbon of the converted phenolic resin is in an amorphous form, a graphite form or a mixture of amorphous and graphite forms.

6. The synchronizer ring of claim 4 wherein said carbon of the converted phenolic resin is fixed by said resin.

7. The synchronizer ring of claim 1 wherein the friction layer is adhered to said conical friction surface by a phenolic resin adhesive.

8. The synchronizer ring of claim 1 wherein the metal of said support body is selected from the group consisting of brass, steel, sintered steel and a brass-steel composite.

9. The synchronizer ring of claim 1 wherein said compacting at a pressure of 10 N/mm$^2$ provides a change in thickness of the friction layer of less than 0.01.

10. The synchronizer ring of claim 1 wherein said compacted carbon fiber reinforced plastic includes residual pores between the flattened peaks.

* * * * *